United States Patent [19]
Roeper

[11] Patent Number: 5,628,703
[45] Date of Patent: May 13, 1997

[54] FLYWHEEL/CLUTCH ARRANGEMENT FOR MANUAL-SHIFT SYNCHRONIZED CHANGE-SPEED GEARBOXES

[75] Inventor: Hartmut Roeper, Monheim, Germany

[73] Assignee: Ford Motor Company, Dearborn, Mich.

[21] Appl. No.: 588,491

[22] Filed: Jan. 18, 1996

[30] Foreign Application Priority Data

Jan. 20, 1995 [DE] Germany ............... 195 01 590.8

[51] Int. Cl.[6] ............... F16H 57/04; F16H 1/36; F16H 3/12
[52] U.S. Cl. ............... 475/159; 475/207; 475/343; 192/3.52
[58] Field of Search ............... 475/207, 159, 475/343; 192/3.52

[56] References Cited

U.S. PATENT DOCUMENTS

| | | | |
|---|---|---|---|
| 1,155,601 | 10/1915 | Miles | 475/207 |
| 1,428,221 | 9/1922 | De Martino | 475/207 |
| 3,359,832 | 12/1967 | Schjolin et al. | 475/159 X |
| 4,346,624 | 8/1982 | Nagasaki et al. | 475/159 |
| 4,676,121 | 6/1987 | Kouno | |

Primary Examiner—Charles A. Marmor
Assistant Examiner—Nathan O. Jensen
Attorney, Agent, or Firm—James J. Dottavio

[57] ABSTRACT

A flywheel/clutch arrangement for a synchronized manual-shift change-speed gearbox having a flywheel drivably connected to an engine, the gearbox drivably connected to a planetary gear unit having a sun gear, a ring gear, and planet gears in meshing engagement with the sun gear and ring gear, the planet gears supported by a planet carrier drivably engaged with the engine, the clutch removably engaging the ring gear and the flywheel and the sun gear being drivably connected to an input shaft of the change-speed gearbox.

6 Claims, 4 Drawing Sheets

FLYWHEEL/CLUTCH ARRANGEMENT FOR MANUAL-SHIFT SYNCHRONIZED CHANGE-SPEED GEARBOXES

BACKGROUND OF THE INVENTION

1. Field of the Invention

The invention relates to a flywheel/clutch arrangement for manual-shift synchronized change-speed gearboxes, in particular for motor vehicles having a planetary gear unit.

2. Description of the Prior Art

A flywheel/clutch arrangement of this kind is disclosed in U.S. Pat. No. 4,676,121 ('121). In the arrangement of the '121 patent, a flywheel is carried rotatably on a sleeve input shaft of the change-speed gearbox to which the clutch friction plate is non-rotatably connected and on which the input pinion of the change-speed gearbox is formed. The output shaft of the change-speed gearbox is connected to a sun gear of a planetary gearset. The output shaft is mounted concentrically within the input shaft, and rotates at a variable speed dependent on which gear ratio is currently engaged. The output shaft acts on the planetary gear unit through the sun gear, and thus affects the current speed of rotation of the flywheel.

The purpose of the '121 flywheel/clutch arrangement is to increase the mass moment of inertia of the flywheel/clutch arrangement when idling, and correspondingly decrease the inertia at higher vehicle speeds.

In the arrangement of the '121 patent, torsional vibrations arising from the internal combustion engine while idling are compensated by the high moment of inertia of the flywheel/clutch arrangement, whereby annoying rattling noises in the change-speed gearbox when idling can be avoided. On progressive shifting through the various gear ratios the mass moment of inertia of the flywheel/clutch arrangement is reduced stepwise by the falling speed of rotation of the sun gear connected to the output shaft, so that a quicker response of the internal combustion engine is obtained when demands are made on its performance by the driver.

While the known flywheel/clutch arrangement provides a way of affecting the mass inertial behaviour of such an arrangement, the clutch 10 of the '121 patent is directly connected to the input shaft 9 of the change speed gearbox. Therefore the work of synchronization required includes the mass of the clutch and causes high efforts in shifting the gearbox. It would be desirable to reduce the synchronization efforts of such an arrangement.

SUMMARY OF THE INVENTION

An object of the present invention is to improve the ease of shifting manual-shift synchronized gearboxes, in particular for motor vehicles, without having to employ for this purpose the known expensive measures such as double or triple synchronization. These measures become necessary when, as a result of higher power of the internal combustion engine, the flywheel/clutch arrangement has to be adapted to correspond to the higher power, with a corresponding increase in the mass moment of inertia of the clutch friction plate. The increased mass moment of inertia of the clutch friction plate gives rise to increased work of synchronization in the shifting of the different gear ratios, which shows up at the gearshift lever as an undesirably high shift actuating force. Although this shift actuating force can be reduced by known measures such as double or triple synchronization, this necessitates complete redesign of the change-speed gearbox in the region of the synchronizing devices.

It is therefore a further object of the invention to ensure that in the case of an increase in power which necessitates a corresponding adaptation, i.e. increase in size, of the flywheel/clutch arrangement, the good shiftability of a change-speed gearbox which is in itself still of adequate dimensions for this power range, is retained without a redesign of the synchronizing devices having to be undertaken.

Because about 70% of the work of synchronization required in a gear shift consists of the work required for synchronization of the clutch friction plate, and the work for the synchronization of the gearbox gearwheels is only a more modest 30%, the present invention seeks to split off the moment of inertia of the clutch friction plate to the greatest possible extent through the splitting action of the planetary gear unit. Thus, the work of synchronization needed in a gear shift can be decreased to such an extent that the simple synchronizing devices provided as standard in change-speed gearboxes are able to perform this work just as they are and with the desired low shift actuating forces.

The present invention thereby optimizes the design of the friction plate clutch, which hitherto has involved a forced compromise between the desirable size of the clutch and the minimization of the mass moment of inertia of such a clutch. The clutch is designed according to the requirements of the increase in power without an impairment of the shiftability of the change-speed gearbox. The present invention can therefore use larger clutch plates, e.g. for reasons of service life, without, as heretofore, impairing shiftability—as was the case with existing gearboxes with double or triple synchronization.

A further advantage of the present invention is that the planetary gear unit with its two free elements floating when the clutch is disengaged leads to a reduction of the undesired idling rattle, since the troublesome torsional vibrations can only act on the gear shafts by a correspondingly damping roundabout route.

According to the invention, these objects are achieved by arranging the planetary gear unit of a flywheel/clutch arrangement of the kind referred to above in such a way that the flywheel is fixed to the crankshaft, the clutch friction plate is fixed to the ring gear and the sun gear is fixed to the input shaft of the change-speed gearbox.

DESCRIPTION OF PREFERRED EMBODIMENTS

Figure 1A:
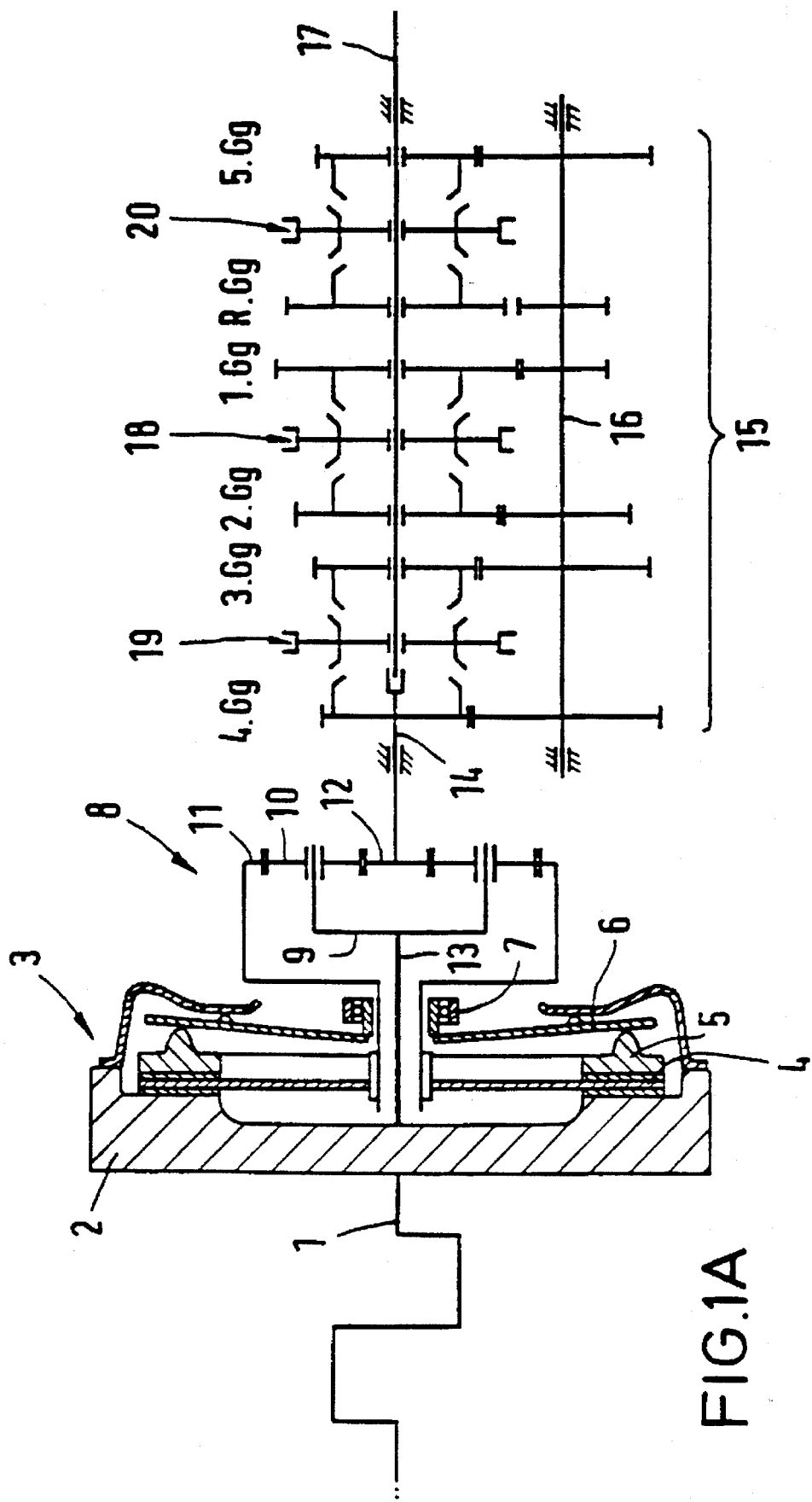
FIG. 1A is a schematic representation of a flywheel/clutch arrangement together with the planetary gear unit and the manually shiftable synchronized change-speed gearbox.

In FIG. 1A the numeral 1 indicates the crankshaft of an internal combustion engine. The crankshaft 1 is fixed to a flywheel 2, on which there is fitted, in known manner, a friction plate clutch 3 which consists essentially of a clutch plate 4 which is loaded between the flywheel 2 and a clamping plate 5 by means of a clutch spring 6, and can be actuated for engagement and disengagement by means of an engaging and disengaging device 7 as is known in the art.

A planetary gear unit 8 arranged in the region of the flywheel/clutch arrangement 2/3 consists of a planet gear carrier 9 having planet gears 10 which mesh with a ring gear 11 and a sun gear 12.

The planet gear carrier 9 is drivingly connected via a shaft 13 to the flywheel 2. The sun gear 12 is drivingly connected to the input shaft 14 of the change-speed gearbox, which is indicated generally by the numeral 15. The change-speed gearbox 15 is shown schematically in the form of a countershaft gearbox, in which there are provided a countershaft 16 carrying fixed gearwheels parallel to the input shaft 14, and an output shaft 17 coaxial with the input shaft 14. The output shaft 17 carries synchronizing devices 18, 19 and 20 for shifting five forward gears (1 . . . 5.Gg) and one reverse gear (R.Gg).

The design of the change-speed gearbox as such is not subject matter of the present invention, and accordingly different designs, such as, for example, ones with synchronizing devices carried on the countershaft 16 can also be used.

Figure 1B:
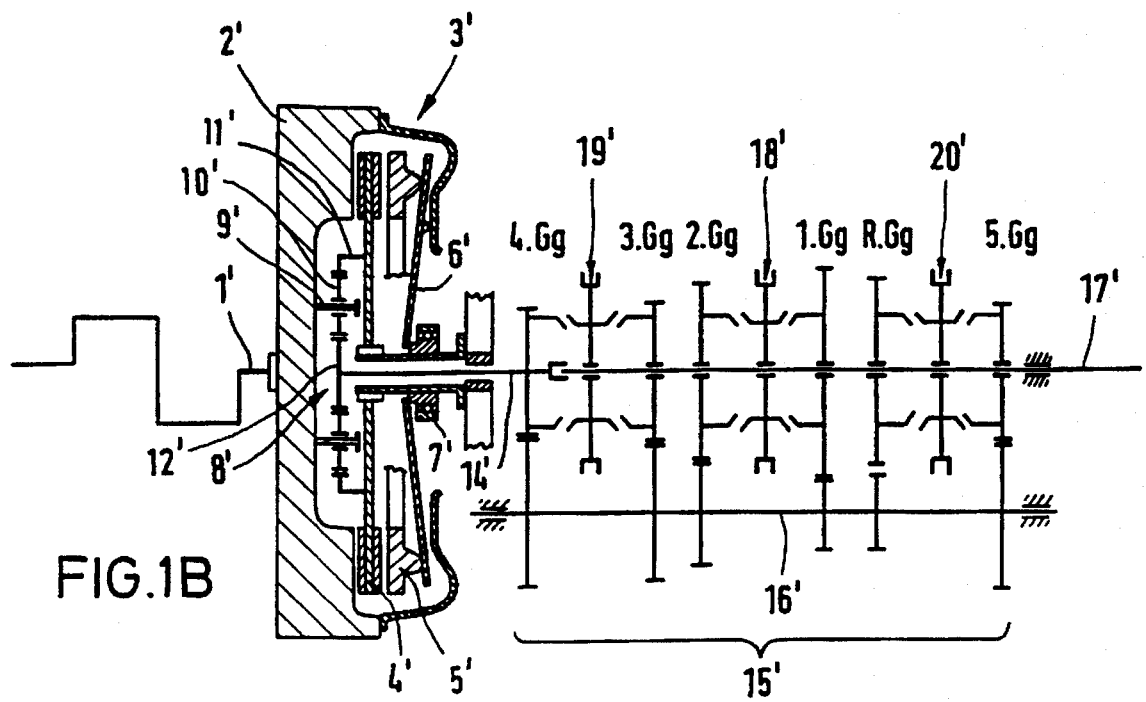
FIG. 1B is a schematic representation of a second embodiment of a flywheel/clutch arrangement in accordance with the invention.

In FIG. 1B a second embodiment of the invention is shown in which the components substantially corresponding to those in FIG. 1A are indicated by the same reference numerals as in FIG. 1A, but modified with a prime symbol. The embodiment shown in FIG. 1B differs from that shown in FIG. 1A only in the different manner of fitting the planetary gear unit 8', i.e., directly on the flywheel 2'.

Figure 1C:
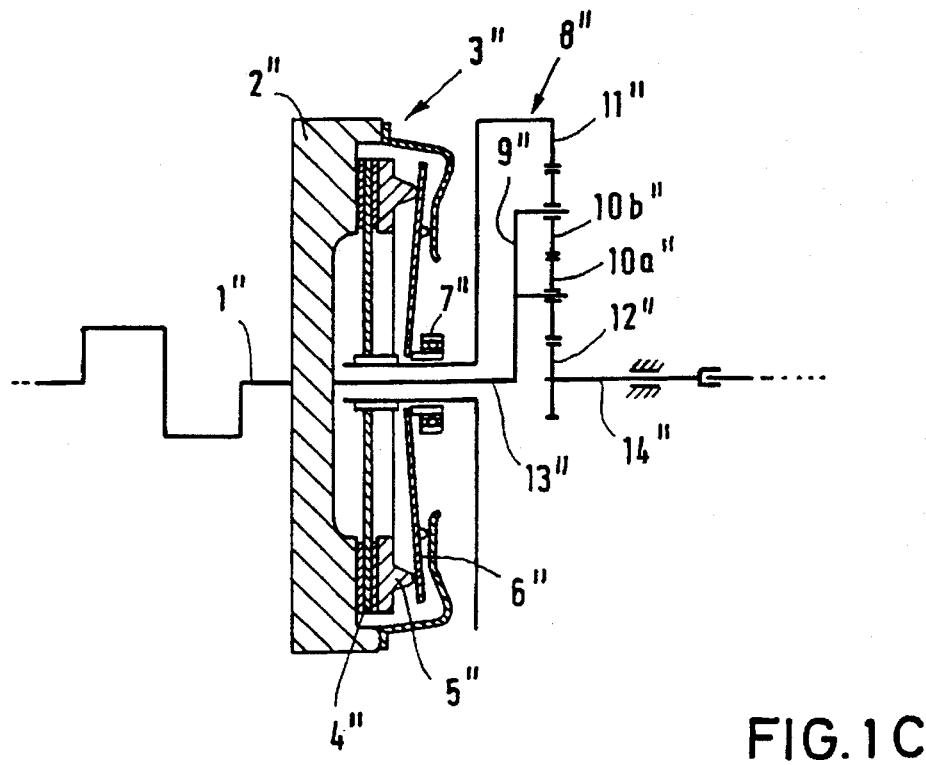
FIG. 1C is a schematic representation of a further embodiment similar to that shown in FIG. 1A.

In FIG. 1C a further embodiment of the invention is shown in which the same reference numerals as in FIG. 1A are again used, but modified with a double prime symbol. The only difference between the embodiment shown in FIG. 1C and that shown in FIG. 1A lies in the use of a planetary gear unit 8" which has on its planet carrier 9" two sets of planet gears, 10a" and 10b" meshing with one another.

Figure 2:
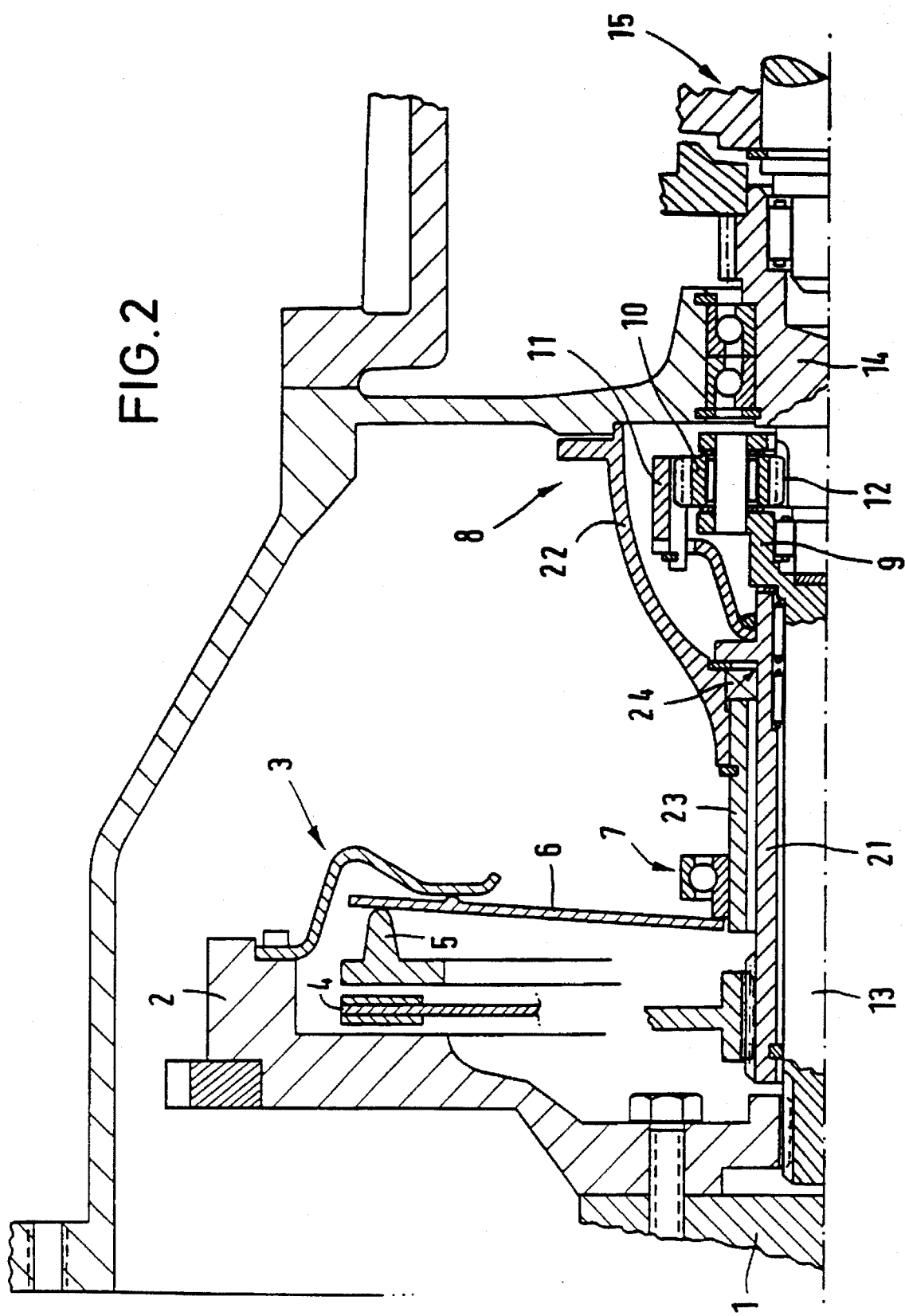
FIG. 2 is a partial section through a first proposed mechanical construction for implementing the invention.

In FIG. 2 a first proposal for mechanical construction is shown, in which the same reference numerals as in FIG. 1A are used, since these indicate the same components. A flywheel 2 is connected non-rotatably to the crankshaft 1 of an internal combustion engine in a known manner. A conventional friction plate clutch 3, which consists essentially of a clutch plate 4, a clamping plate 5, a clutch spring 6 and a disengaging device 7, is connected to the flywheel 2.

A planetary gear unit 8, arranged in the region of the flywheel/clutch arrangement 2/3, consists of a planet gear carrier 9 having planet gears 10 which mesh with a ring gear 11 and a sun gear 12. The planet gear carrier 9 is drivingly connected to the flywheel 2 by a shaft 13. The sun gear 12 is drivingly connected to, or preferably integral with, the input shaft 14 of the change-speed gearbox, which is indicated generally by the reference numeral 15.

The clutch friction plate 4 is drivingly connected to the ring gear 11 of the planetary gear unit 8 by a sleeve shaft 21 concentrically embracing the shaft 13. On a housing 22 for the planetary gear unit 8, connected to the gearbox housing, there is a fixed sleeve 23 on which the engaging and disengaging device 7 of the friction clutch 3 is arranged.

Through the housing 22 of the planetary gear unit 8, which adjoins the gearbox housing, the planetary gear unit 8 can be included in the lubricant circuit of the change-speed gearbox, and escape of the lubricant into the region of the flywheel/clutch arrangement is prevented by a suitable seal 24.

Figure 3:
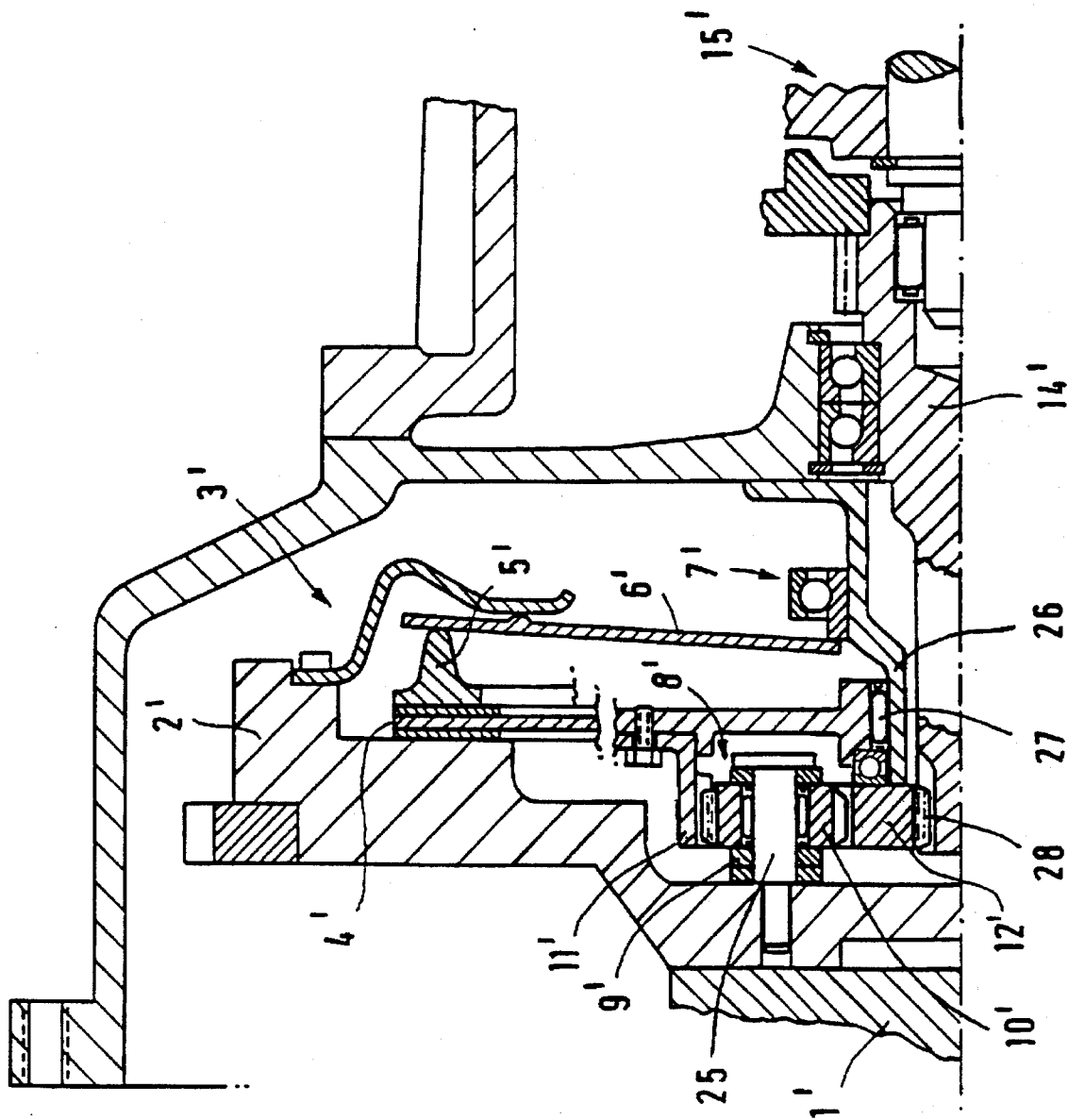
FIG. 3 is a partial section through a second proposed mechanical construction for implementing the invention.

FIG. 3 shows a planetary gear unit 8' arrangement outside the lubricant circuit of the change-speed gearbox. The planetary gear unit 8' is arranged in the region of the flywheel/clutch arrangement 3' and must be provided with suitable means for lifetime lubrication of the planetary gear unit 8'. This embodiment is substantially shorter and therefore comes into consideration for engine-gearbox aggregates which are arranged in the vehicle transverse to the drive for the front wheels. The same reference numerals are used as in FIG. 1B, since the parts concerned here are the same.

The difference between the embodiment shown in FIG. 3 to that shown in FIG. 2 lies in the arrangement of the planetary gear unit 8' in the region of the flywheel/clutch arrangement 3'. The planet gear carrier 9' is directly connected to the flywheel 2' by press-fitted pins 25. The ring gear 11' is mounted on the clutch plate 4' by means of a centering projection, and the hub of the clutch plate 4' is rotatably mounted, e.g. through a sealed needle bearing 27 on a fixed sleeve 26 carrying the disengaging device 7'. The outer region of the clutch plate 4' can resiliently provide for the axial movement of the clutch plate 4'. The sun gear 12' is drivingly connected to the extended input shaft 14' of the gearbox 15', e.g. through splines 28.

The bearings and supports for the different shafts indicated in the region of the planetary gear unit 8' and in the region of the input shaft of the change-speed gearbox 15' are only shown as a possible embodiment, and in no way represent advantageous constructional solutions.

In accordance with the invention as shown in FIG. 1A, when the friction clutch 3 is engaged the planetary gear unit 8 is blocked and accordingly torque transfer to the input shaft 12 of the change-speed gearbox 15 takes place without involvement of the planetary gear unit 8. However, when the friction clutch 3 is uncoupled by actuation of the engaging-disengaging device 7, kinematic coupling of the engine torque takes place from the crankshaft 1, via the flywheel 2 and the shaft 13, to the planet gear carrier 9, and from its planet gears 10 to the ring gear 11 with the clutch plate 4 and to the sun gear 12 with the input shaft 14, the countershaft 16 and the output shaft 17. As a result of this, the ring gear 11 and the sun gear 12 form practically freely floating elements of the planetary gear unit 8, whereby the mass moment of inertia to be accelerated or retarded during a gear shift is split up into that of the clutch plate 4 and that of gearwheels of the gearbox 15.

This different way of connecting the per se known planetary gear unit 8 to a flywheel/clutch arrangement 2/3 results in the engine torque being introduced into the planetary gear unit 8 via the planet carrier 9 and the two free elements of the planetary gear unit 8. The ring gear 11 is connected to the clutch friction plate 4 and the sun gear 12 is connected to the input shaft 14, which is able to float freely when the clutch 3 is disengaged. Thus while the work of synchronization that has to be performed during shifting of a gear ratio includes the acceleration or deceleration of the gearwheels of the gearbox 15, only a fractional part of the acceleration and deceleration of the clutch friction plate 4 has to be included.

Thus, the mass moment of inertia of the clutch plate 4 effective in the work of synchronization, which in itself makes the major contribution, is reduced, through the gear ratio present in the planetary gear unit 8 and the possibilities of reaction that are provided, to a fraction—about ⅓—of its normal amount (based on the planetary reduction). The extent to which the moment of inertia of the clutch friction plate 4 has to be taken into account in the work of synchronization depends on the gear ratio chosen for the planetary gear unit 8.

The arrangement of the additional planetary gear unit 8 in the region of the flywheel/clutch arrangement 2/3 represents an additional constructional outlay, which gives rise to expense, but when account is taken of the fact that such an arrangement makes it possible to combine a more powerful internal combustion engine with an existing change-speed gearbox without its shiftability becoming unacceptably poor, it will be appreciated that this additional constructional cost can be far less than that which would be necessary for redesign and adaptation of the change-speed gearbox with a double or triple synchronization.

Although the preferred embodiments of the present invention have been disclosed, various changes and modifications may be made without departing from the scope of the invention as set forth in the appended claims.

What is claimed is:

1. A flywheel/clutch arrangement for a synchronized manual-shift change-speed gearbox for a motor vehicle having a flywheel drivably connected to an engine, the gearbox drivably connected to a planetary gear unit having a sun gear, a ring gear, and a plurality of planet gears in meshing engagement with the sun gear and ring gear, the planet gears supported by a planet carrier comprising:

the planet carrier drivably engaged with the engine;

the clutch drivably engaging and releasing the ring gear and the flywheel; and the sun gear being drivably connected to an input shaft of the change-speed gearbox.

2. The flywheel/clutch arrangement of claim 1, wherein the sun gear is drivingly connected to the input shaft and the clutch is drivingly engaged to the ring gear.

3. The flywheel/clutch arrangement according to claim 2, wherein the sun gear is fixed to the input shaft of the change-speed gearbox and the clutch plate is fixed to the ring gear.

4. A flywheel/clutch arrangement according to claim 1, further comprising:

a first housing encasing the change-speed gearbox;

a second housing adjacent the first housing encasing the planetary gear unit; and a lubricant circuit provided in the change speed gearbox for lubrication of the change-speed gearbox and the planetary gear unit.

5. The fly wheel/clutch arrangement of claim 4, wherein the second housing is sealingly engaged with the first housing.

6. A flywheel/clutch arrangement according to claim 1, further comprising:

the planet carrier comprises the flywheel; and the planetary gear unit is arranged adjacent the flywheel in a closed compartment provided with lifetime lubrication.

* * * * *